US007694979B2

(12) United States Patent
Jokinen

(10) Patent No.: US 7,694,979 B2
(45) Date of Patent: Apr. 13, 2010

(54) PREMOUNTING DEVICE FOR CUTTING RING FITTING

(76) Inventor: Jukka Jokinen, Muuntajantie 8, FI-07600 Myrskyä (FI)

(*) Notice: Subject to any disclaimer, the term of this patent is extended or adjusted under 35 U.S.C. 154(b) by 961 days.

(21) Appl. No.: 10/573,260

(22) PCT Filed: Sep. 21, 2004

(86) PCT No.: PCT/FI2004/000555

§ 371 (c)(1),
(2), (4) Date: Jun. 26, 2006

(87) PCT Pub. No.: WO2005/028155

PCT Pub. Date: Mar. 31, 2005

(65) Prior Publication Data

US 2007/0073411 A1 Mar. 29, 2007

(30) Foreign Application Priority Data

Sep. 23, 2003 (FI) .................................. 20031373

(51) Int. Cl.
*B23B 31/177* (2006.01)
*B23P 19/04* (2006.01)
*F16L 19/08* (2006.01)

(52) U.S. Cl. ......................... 279/108; 279/37; 279/141; 294/86.3; 294/116

(58) Field of Classification Search ................... 279/35, 279/37, 106, 108, 141; 294/86.3, 86.31, 294/116; 29/259, 278, 255; 285/311, 364, 285/406; *B23B 31/177; F16L 19/08; B23P 19/04*
See application file for complete search history.

(56) References Cited

U.S. PATENT DOCUMENTS

| | | | | |
|---|---|---|---|---|
| 668,928 | A * | 2/1901 | Parsons | 65/297 |
| 1,486,467 | A * | 3/1924 | Spitzfaden | 279/108 |
| 2,007,521 | A * | 7/1935 | Deeter | 285/148.23 |
| 3,998,467 | A * | 12/1976 | Petkovich | 279/37 |
| 5,253,880 | A * | 10/1993 | Won | 279/106 |
| 5,909,911 | A * | 6/1999 | Long | 29/259 |
| 6,134,992 | A * | 10/2000 | Perkins | 81/90.5 |
| 6,305,697 | B1 * | 10/2001 | Tebbe | 279/107 |

(Continued)

FOREIGN PATENT DOCUMENTS

DE 38 43 450 6/1990

(Continued)

*Primary Examiner*—David P Bryant
*Assistant Examiner*—Eric A Gates
(74) *Attorney, Agent, or Firm*—Young & Thompson

(57) ABSTRACT

A premounting device for a cutting ring fitting, the device including a frame part (1), support elements (2), a movable actuator (3), elements for moving the movable actuator (3) and a socket member (10) that is detachably attached to the movable actuator (3), the movable actuator (3) being arranged to move outwardly from the frame part (1). The support elements (2) and the socket member (10) are arranged to cooperate for sandwiching a nut (5) and a cutting ring (6) set on the outer surface of a tubular element (4) between the support elements (2) and the socket member (10) so as to premount a cutting ring fitting. In the premounting device for the cutting ring fitting, the support elements (2) are arranged to be radially adjustable and in operational connection with the socket member (10) to provide the adjustment.

4 Claims, 2 Drawing Sheets

U.S. PATENT DOCUMENTS

| | | | | |
|---|---|---|---|---|
| 6,665,919 | B1 * | 12/2003 | Kurtz et al. | 29/262 |
| 6,684,472 | B2 * | 2/2004 | Abdelmoula et al. | 29/262 |
| 7,234,376 | B2 * | 6/2007 | Bader | 81/55 |
| 2003/0173773 | A1 * | 9/2003 | Udhoefer et al. | 285/18 |

FOREIGN PATENT DOCUMENTS

| | | |
|---|---|---|
| DE | 44 31 112 | 4/1996 |

* cited by examiner

PREMOUNTING DEVICE FOR CUTTING RING FITTING

BACKGROUND OF THE INVENTION

The invention relates to premounting devices for a cutting ring fitting.

A known premounting device for a cutting ring fitting comprises a device frame, which includes a socket means and means for moving the socket means as well as support means arranged to be attached to the device frame. The support means comprise a substantially U-shaped recess, in which a pipe can be placed. The socket means comprise a socket, whose inner diameter is larger than the outer diameter of the pipe and whose inner surface is arranged to give the cutting ring a desired shape.

When the cutting ring fitting is premounted with the above-described device, the cutting ring and a corresponding nut are placed on the outer surface of the pipe close to a pipe end. The pipe end is set in the premounting device of the cutting ring such that the cuffing ring and the corresponding nut are substantially between the support means and the device frame, the nut on the side of the support means. Thereafter the socket means is displaced hydraulically, for instance, outwardly from the device frame such that the cutting ring is sandwiched between the socket means and the nut, whereby the cutting ring is shaped in a desired manner.

The above arrangement has a drawback that it requires several different support means with the U-shaped recess to correspond to different outer diameters of the pipes and the nuts arranged thereto. So, if the pipe on which the cutting ring fitting is to be premounted has a diameter that differs from that of the previous pipe, on which a cutting ring fitting was premounted, the support means must be changed. It is difficult and time-consuming to use this kind of a premounting device for a cutting ring fitting. Moreover, loose support means may be lost.

BRIEF DESCRIPTION OF THE INVENTION

The object of the invention is to provide a premounting device for a cutting ring fitting, by which the above-mentioned problems can be solved. This is achieved with a premounting device for a cutting ring fitting, which is characterized by what is disclosed in the independent claim. The preferred embodiments are disclosed in the dependent claims.

The invention is based on the idea that support means are arranged to be radially adjustable and in operational connection with a socket means so as to provide said adjustment.

The premounting device for the cuffing ring fitting according to the invention has an advantage that it enables premounting of cutting ring fittings on pipes of different diameters without support means changes. Another advantage is that it is easy to use, which results from the fact that the motion of the socket means controls the position of the support means automatically.

BRIEF DESCRIPTION OF THE DRAWINGS

In the following the invention will be described in greater detail in connection with preferred embodiments, with reference to the attached drawings, wherein.

DETAILED DESCRIPTION OF THE INVENTION

Figure 1A:
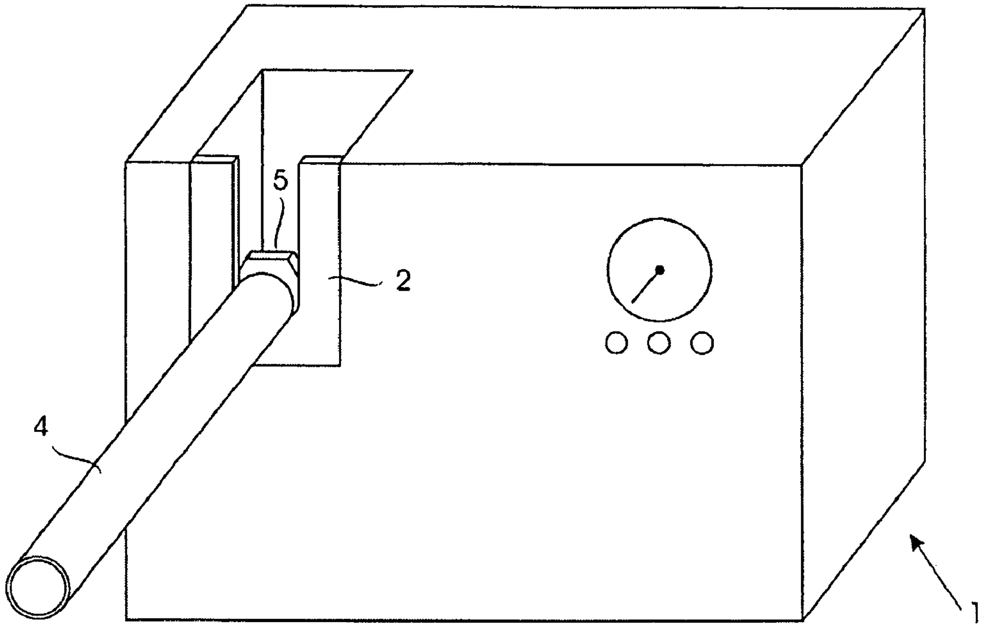
Fig. 1A PRIOR ART
FIG. 1A is a perspective view of a prior art premounting device for a cutting ring fitting seen obliquely from above.
Figure 1B:
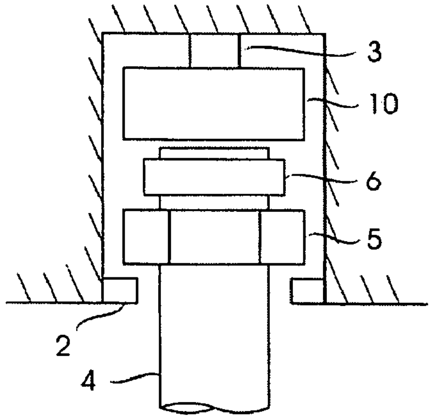
Fig. 1B PRIOR ART
FIG. 1B is a partial top view of the device of FIG. 1A.

FIGS. 1A and 1B show a prior art premounting device for a cutting ring fitting. It appears from FIG. 1A that support means 2 connected to a frame part 1 comprise a substantially U-shaped recess, in which a pipe can be placed. FIG. 1B also shows a nut 5 and a cutting ring 6 that are set on the outer surface of the pipe for the premounting of the cutting ring fitting. The cutting ring 6 is given a desired shape by moving a movable actuator 3 outwardly from the frame part 1, whereby the cutting ring 6 is sandwiched between a socket means 10 connected to the movable actuator 3 and the nut 5 supported by the support means 2. The distance between support surfaces of the support means 2 as shown in FIGS. 1A and 1B cannot be adjusted in the radial direction of the pipe, so when this kind of a premounting device for a cutting ring fitting is used for pipes having different diameters it requires that the support means 2 be changed.

Figure 2:
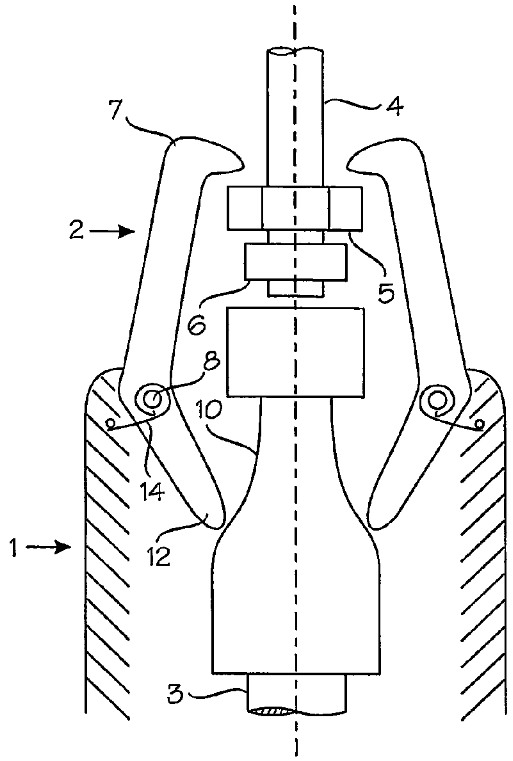
FIG. 2 is a partial view of an embodiment of the premounting device for the cutting ring fitting according to the invention.

FIG. 2 is a partial view of an embodiment of a premounting device for a cutting ring fitting according to the invention, which comprises a frame part 1, support means 2, a movable actuator 3 and means for moving the movable actuator 3. Like FIG. 1B showing the prior art, FIG. 2 also shows a socket means 10 connected to the movable actuator 3 and a nut 5 and a cutting ring 6, which are set on the outer surface of a tubular element 4 for the premounting of the cutting ring fitting.

In the premounting device of the cutting ring fitting of FIG. 2, the support means 2 comprise two jaw parts 7 hinged to the frame part by means of hinges 8, which jaw parts are capable of turning between open and closed positions. In the open position the tips of the jaw parts 7 are wide apart and in the closed position the tips of the jaw parts 7 are close to, or in contact with, the outer surface of the tubular element 4 locating between the jaw parts. It depends, for instance, on the outer diameter of the nut 5 used, how close to the outer surface of the tubular element 4 the tips of the jaw parts 7 of the support means 2 should be when the cutting ring fitting is premounted.

The support means 2 of the device in FIG. 2 comprise operating protrusions 12 that are arranged to be in operational connection with the socket means 10 in order to provide radial adjustment of the support means 2. There are two operating protrusions 12, one for each jaw part 7. Each operating protrusion 12 forms an integral member with a respective jaw part 7 and extends substantially on the other side of the hinge 8 than the respective jaw part 7.

The device of FIG. 2 is provided with spring means 14, which tend to turn the support means 2 to the open position.

When a cutting ring fitting is premounted with the device of FIG. 2, the cutting ring 6 and the nut 5 are set on the outer surface of the tubular element 4, close to the end of the element, such that the cutting ring 6 is closer to that end of the tubular element 4 on which the cutting ring fitting is to be premounted. Prior to mounting the movable actuator 3 is in its rest position close to the frame part 1, whereby the operating protrusions 12 of the support means 2 come into contact with a slim middle portion of the socket means 10. When the operating protrusions 12 of the support means 2 come into contact with the slim middle portion of the socket means 10, the support means 2 are in their open position and the tips of the jaw parts 7 are wide apart, which facilitates the setting of the pipe portion equipped with the nut 5 and the cutting ring 6 between the support means 2 and the socket means 10.

As the jaw parts 7 of the support means 2 are in the open position, the end of the tubular element 4 is set adjacent to the socket means 10 connected to the movable actuator 3 such that the tubular element 4 and the socket means 10 are substantially coaxial. When the pipe portion equipped with the nut 5 and the cutting ring 6 sits between the jaw parts 7 of the support means 2 and the socket means 10, the movable actuator 3 will be moved outwardly from the frame part 1.

As the movable actuator 3 is moved, the socket means 10 connected thereto moves along. The root of the socket means 10 is larger in diameter than the middle portion of the socket means 10, a change in diameter taking place gradually. For the radial adjustment of the support means 2, the diameters of the middle portion and the root are of importance only at points where the socket means is arranged to be in operational connection with the support means 2.

As the movable actuator 3 is moved outwardly from its rest position the contact points of the operating protrusions 12 of the support means 2 and the socket means 10 transfer from the slim middle portion of the socket means 10 to the root portion that is larger, whereby the support means 2 pivot on the hinges 8 towards the closed position. When said contact points have transferred to the largest portion in the socket means 10, the support means are in their closed position.

At the same time, when the support means 2 reach their closed position, the socket means 10 is further moved outwardly with respect to the frame part 1. Shaping of the cutting ring 6, while sandwiching It between the socket means 10 and the nut 10, takes place in the corresponding manner as in prior art premounting devices.

After the cutting ring 6 has been given the desired shape, the movable actuator 3 is moved back to its rest position, whereby the spring means 14 turn the support means 2 into their open position and the pipe portion equipped with the premounted cutting ring fitting can be removed from between the support means 2 and the socket means 10.

In an alternative embodiment the socket means 10 is arranged to cooperate with the support means 2 such that to move the socket means 10 towards the frame part 1 forces the support means 2 in their open position.

The socket means 10 of the premounting device for the cutting ring fitting shown in FIG. 2 is an integral member, which comprises a socket arranged for shaping the cutting ring 6. For each pipe size there is a specific socket means 10 that comprises a socket specially adapted for the pipe size concerned. The body of the socket means 10, i.e. the part with which the operating protrusions 12 of the support means are in contact so as to provide radial adjustment, can be shaped differently for different pipe sizes, whereby the open position and the closed position of the support means 2 are different for pipes of different sizes.

In one embodiment of the invention the bodies of the socket means 10 arranged for pipes of different sizes are shaped such that the diameters of the middle portion and the root of the socket means 10 of a large pipe are relatively small, and the diameters of the middle portion and the root of the socket means 10 of a small pipe are relatively large. Thus, in the case of a large pipe both the open position and the closed position of the support means 2 are wider than in the case of a small pipe. In other words, the tips of the jaw parts 7 of the support means are both in the open position and in the closed position of the support means 2 wider apart from each other in the case of a large pipe than in the case of a small pipe. Alternatively the socket means 10 intended for different pipe sizes can be designed such that only the closed positions of the support means 2 differ from one another, whereby in the open position of the support means 2 the tips of the jaw parts 7 are equally wide apart both in the case of large pipes and in the case of small pipes.

When desired, the socket means 10 can be provided such that it comprises a body, which is in operational connection with the support means 2 to provide radial adjustment of the support means, and a socket part, which is detachably attached to said body. Thus, only the socket part is changed when the pipe size changes, and the socket part may be the same as those used in prior art premounting devices for cutting ring fittings.

Different open and closed positions of the support means 2 for different pipe sizes can also be achieved with a socket means 10, whose body is the same for all pipe sizes. This is achieved, for instance, by arranging the body of the socket means 10 to be rotatable and by shaping said body such that its diameter is different measured at different points of its periphery. When the cutting ring is to be premounted on a large-diameter pipe, the body of the socket means 10 is turned to a position, in which the operating protrusions 12 of the support means 2 come into contact with the point where the diameter of the body of socket means 10 is small. Correspondingly, when the cutting ring is to be premounted on a small-diameter pipe, the body of the socket means 10 is turned to a position, in which the operating protrusions 12 of the support means 2 come into contact with the point where the diameter of the body of socket means 10 is large.

The above-mentioned rotatability of the body of the socket means 10 can be provided by the structure of the frame 1 of the premounting device for the cutting ring or that of the body of the socket means 10.

Figure 3:
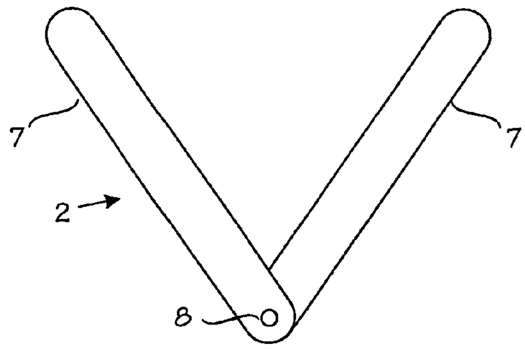
FIGS. 3 and 4 show support means of a second embodiment of the premounting device for the cutting ring fitting according to the invention.

In the device of FIG. 2 the slewing axes of the hinges 8 of the jaw parts 7 are spaced apart. FIG. 3 shows an alternative embodiment seen from the direction of the slewing axis of the hinge 8. In this embodiment the jaw parts 7 are hinged such that their slewing axes coincide, i.e. both of the jaw parts 7 turn about the same axis.

Figure 4:
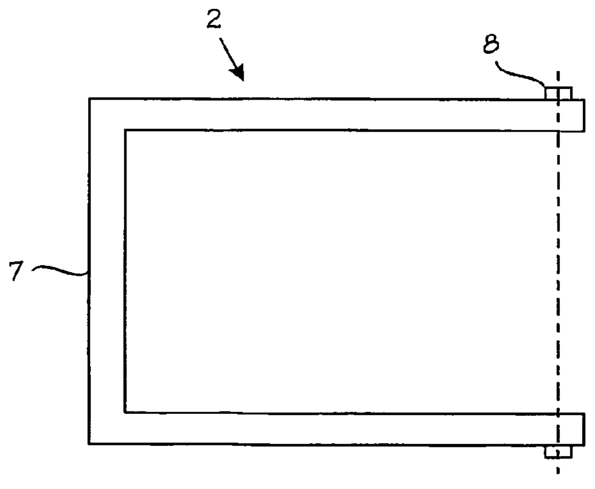

FIG. 4 shows one jaw part 7 of FIG. 3 seen from a direction that is perpendicular to the slewing axis of the hinge 8. The jaw part 7 is substantially U-shaped such that the slewing axis passes close to the tips of the U-prongs. FIGS. 3 and 4 do not show the operating protrusions of the support means 2.

In the premounting device for the cutting ring fitting according to the invention the working pressure need not necessarily be adjustable. Suitable pressing for the cutting ring 6 can be achieved, for instance, by shaping the socket means 10 intended for different pipe sizes to be different in length. By changing the length of the socket means 10 it is possible to extend the pressing effect at different distances from the frame part 1 by standard working motion of the movable actuator 3.

It is obvious that when using the premounting device for the cutting ring fitting, in which the amount of pressure is only controlled by varying the size of the socket means, the pipes, the cutting rings and the nuts used for mounting must be substantially standard in dimensions. For instance, using a nut that is thinner than normal may have a result that the cutting ring 6 is not pressed into a desired shape by a standard working motion of the movable actuator 3.

The support means 2 of the premounting device for the cutting ring fitting according to the invention may comprise centring means, by which it will be ensured that the tubular element 4 as well as the nut 5 and the cutting ring 6 set on the outer surface thereof are positioned coaxially with the socket means 10 as the cutting ring fitting is premounted. The centring means may comprise substantially U-shaped notches provided at the tips of the jaw parts 7.

According to one preferred embodiment of the present invention the premounting device is a portable device, whose frame part 1 in view of working characteristics is shaped substantially similar to a typical cordless power drill. This device can be arranged for use in connection with pipes whose outer diameter is about 6 to 42 mm, for instance.

The premounting device for the cutting ring fitting according to the invention is primarily intended for premounting cutting ring fittings on metal pipes.

It is obvious to a person skilled in the art that the basic idea of the invention can be implemented in a variety of ways. Thus, the invention and its embodiments are not restricted to the above-described examples, but they may vary within the scope of the claims.

The invention claimed is:

1. A premounting device for a cutting ring fitting, the device comprising:

a frame part;

a support;

a movable actuator;

a means for moving the movable actuator; and a socket means for controlling a position of the support automatically, the socket means being detachably attached to the movable actuator, wherein the movable actuator is arranged to move outwardly from the frame part, wherein the support and the socket are arranged to cooperate for sandwiching a nut and a cutting ring set on the outer surface of a tubular element between the support and the socket means so as to premount a cutting ring fitting, wherein the support is arranged to be radially adjustable and in operational connection with the socket means to provide said adjustment, and wherein the socket means is shaped such that as the movable actuator is in its rest position close to the frame part the socket means allows the support to be in an open position and as the movable actuator is moved from its rest position for a predetermined distance outwardly with respect to the frame part the socket means forces the support to move to a closed position.

2. A premounting device for a cutting ring fitting as claimed in claim 1, wherein the middle portion of the socket means is smaller in diameter than the root of the socket means and as the movable actuator is in its rest position the support is in operational connection with the middle portion of the socket means and as the movable actuator is moved for said predetermined distance outwardly with respect to the frame part the support is in operational connection with the root of the socket means.

3. A premounting device for a cutting ring fitting as claimed in claim 1, wherein the socket means is an integral member, which comprises a socket arranged for shaping the cutting ring.

4. A premounting device for a cutting ring fitting as claimed in claim 1, wherein the premounting device comprises spring means for forcing the support towards the open positions.

* * * * *